United States Patent [19]

Lin

[11] Patent Number: 4,920,609

[45] Date of Patent: May 1, 1990

[54] PNEUMATIC DOOR CLOSER

[75] Inventor: Chun-Hsien Lin, Taipez, Taiwan

[73] Assignee: Solid Well International Corp., Taipei, Taiwan

[21] Appl. No.: 383,706

[22] Filed: Jul. 24, 1989

[51] Int. Cl.[5] .......................... F16F 9/32; E05F 3/00

[52] U.S. Cl. .......................... 16/66; 16/85; 16/DIG. 17; 188/300; 92/15

[58] Field of Search ......... 16/49, 58, 66, 85, DIG. 17, 16/DIG. 10, DIG. 21; 92/15, 29; 188/300; 267/64.12

[56] References Cited

U.S. PATENT DOCUMENTS

| | | | |
|---|---|---|---|
| 3,105,264 | 10/1963 | Truhon | 16/49 |
| 3,578,783 | 5/1971 | Loustalet | 92/15 |
| 4,048,695 | 9/1977 | Juilfs et al. | 16/85 |
| 4,155,433 | 5/1979 | Porter | 188/300 |
| 4,178,655 | 12/1979 | Little | 16/DIG. 10 |
| 4,807,855 | 2/1989 | Schuitema | 267/64.12 |
| 4,815,163 | 3/1989 | Simmons | 16/DIG. 17 |

*Primary Examiner*—Richard K. Seidel
*Assistant Examiner*—James Miner
*Attorney, Agent, or Firm*—Harris, Kern, Wallen & Tinsley

[57] ABSTRACT

A door closer is set forth having a housing, a plunger rod in the housing with a plunger at the inner end of the rod, and a main spring around the rod between the plunger and a housing end for urging the rod into the housing. An actuator carried at the housing end with an opening for the rod and mounted for transverse sliding motion relative to the rod, with a spring for urging the actuator into a latch space in the rod is utilized. With the door closer connected to a door, the actuator slides into the latch space when the door has been opened, to hold the door open. A further opening movement raises the actuator out of the latch space and a sleeve maintains the actuator raised, permitting closing of the door.

9 Claims, 2 Drawing Sheets

PNEUMATIC DOOR CLOSER

BACKGROUND OF THE INVENTION

This invention relates to door closing mechanisms and in particular, to a new and improved hold open device for a door closer.

In one conventional door closer design, a clip or washer is mounted on the exposed rod of the closer mechanism, and is manually operated for holding the door in the open position.

In another known design, a ring is fixed on the plunger rod inside the door closer housing, for sliding engagement with a pair of opposed spring hooks carried at one end of the housing. The collar must be forced past the hold open spring hooks in order to hold the door open, and similarly must be forced between the spring hooks in the opposite direction for closing the door. This design is automatic in operation and does away with the external manual clip or washer. However, the force required for operation is relatively large and undesirable in many door installations.

SUMMARY OF THE INVENTION

It is an object of the present invention to provide a new and improved door closer with automatic hold open operation. It is a further object of the invention to provide such a door closer which can be operated with a relatively low force, both for latching in the hold open position and for releasing from the latch condition so that the door can close.

Other objects, advantages, features and results will more fully appear in the course of the following description.

In the preferred embodiment, the hold open device for the door closer includes an actuator carried on the closer housing for transverse sliding motion relative to the closer rod, with the actuator having an opening for the rod to slide through. A collar and a latch space are provided on the rod, with a sleeve sliding on the collar and with a hold open spring positioned for urging the actuator into the latch space to hold the closer in the open position. First interengaging means are provided for limiting motion of the sleeve along the collar, and second interengaging means are provided for moving the actuator out of the latch space for releasing the closer from the hold open position.

DESCRIPTION OF THE PREFERRED EMBODIMENT

Figure 1:
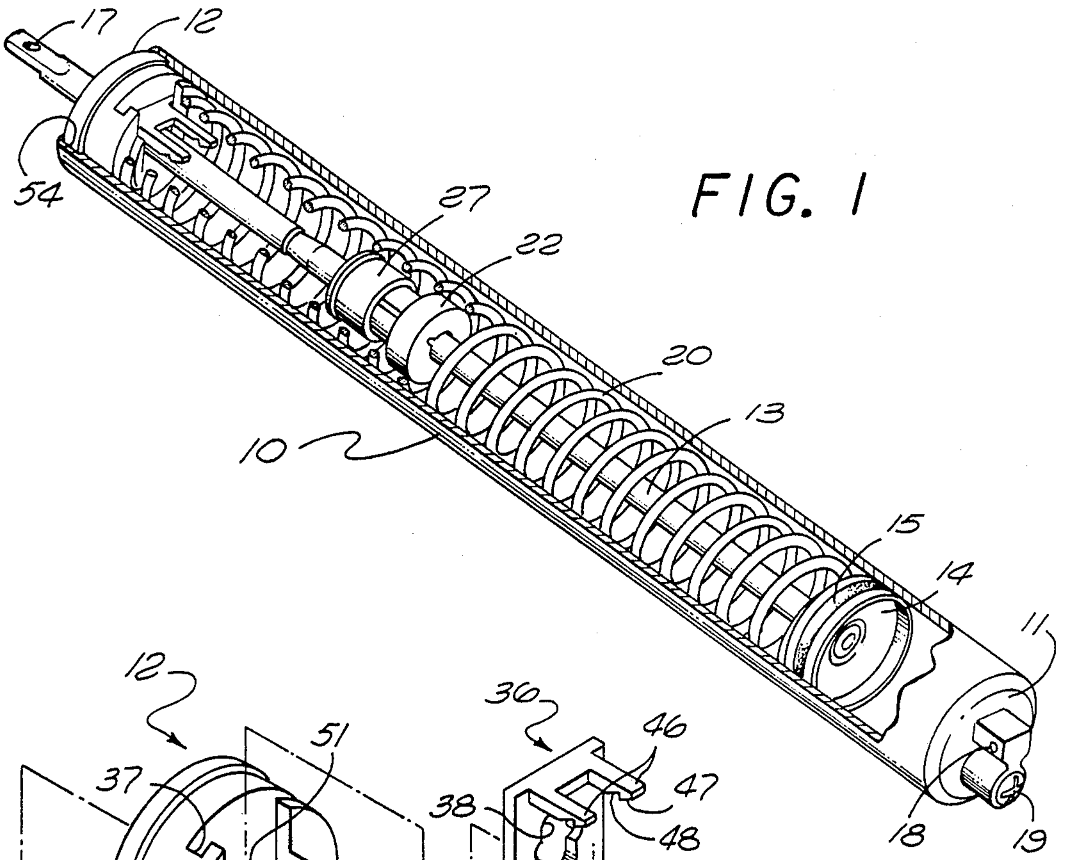
FIG. 1 is a perspective view, partly cut away, showing the presently preferred embodiment of the door closer of the invention.
Figure 2:
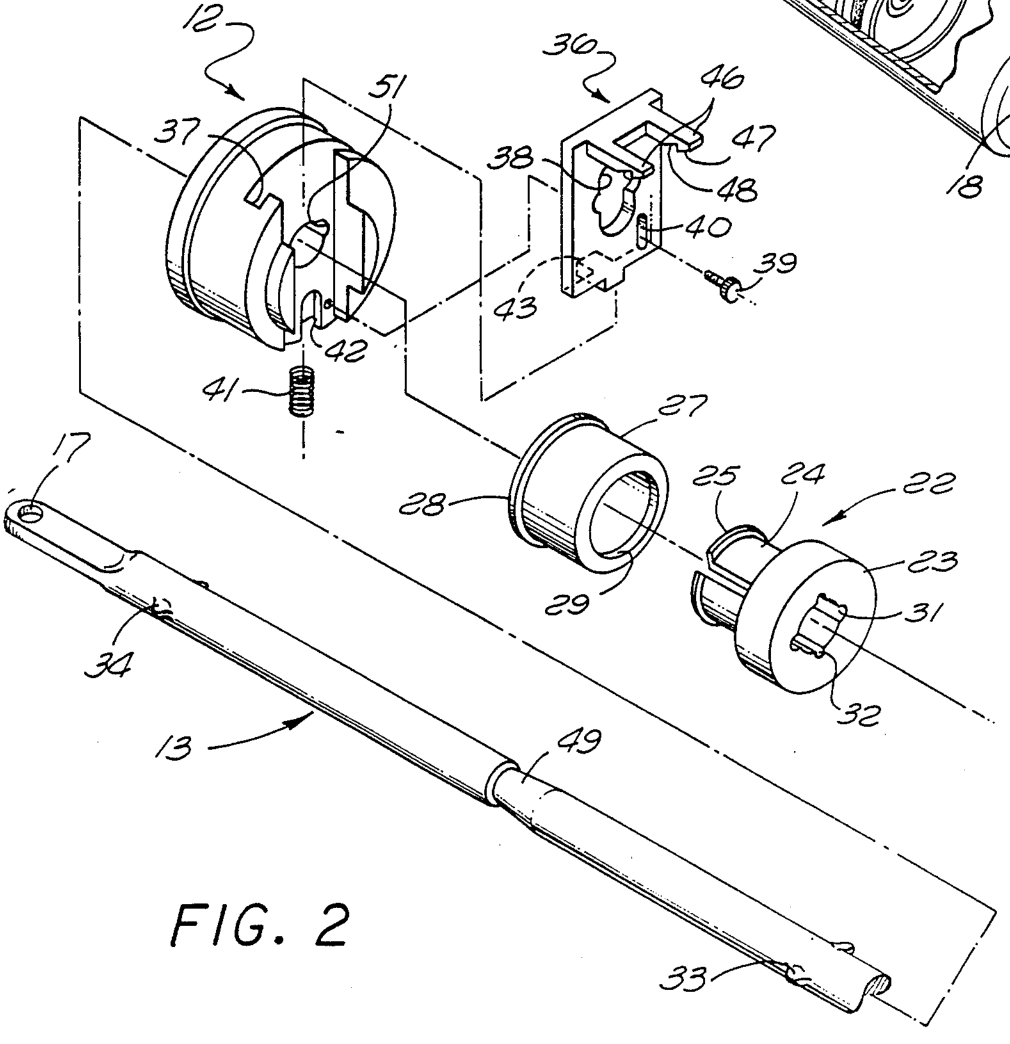
FIG. 2 is an exploded view of the door closer of FIG. 1.

Referring to FIG. 1, the door closure includes a tubular housing 10 which is closed at one end by a front end plug 11 and at the other end by a rear end plug 12. A plunger rod 13 slides in the housing 10, through an axial opening in the rear end plug 12. A plunger 14 with an o ring seal 15 is carried at the inner end of the plunger rod 13.

A mounting opening 17 is provided at the outer end of the plunger rod, and another mounting opening 18 is provided in the front end plug 11. A speed regulating valve 19 is also carried in the front end plug 11.

A main spring 20 is positioned within the housing 10 about the rod 13 between the rear end plug 12 and the plunger 14. The construction of the door closer as thus far described is conventional.

A collar 22 is carried on the rod, with the collar having a body 23, a split shell 24 and a split outer rim 25.

Figure 3:
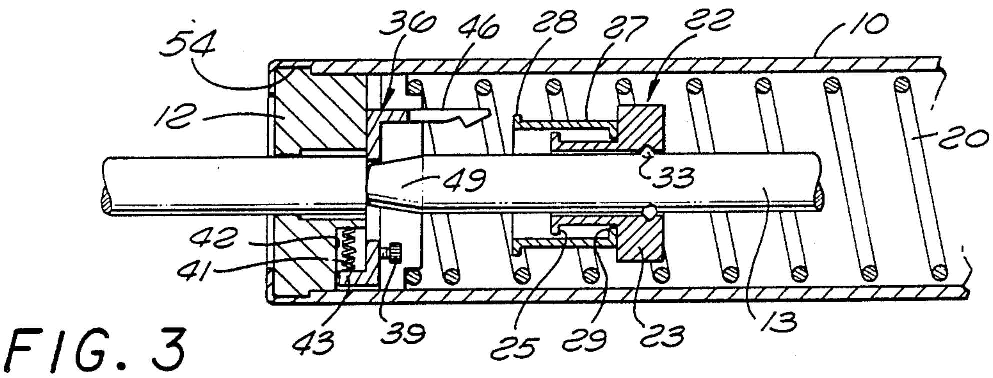
FIGS. 3, 4, 5, and 6 are partial sectional views of the door closer of FIG. 1 illustrating the operation.
Figure 6:
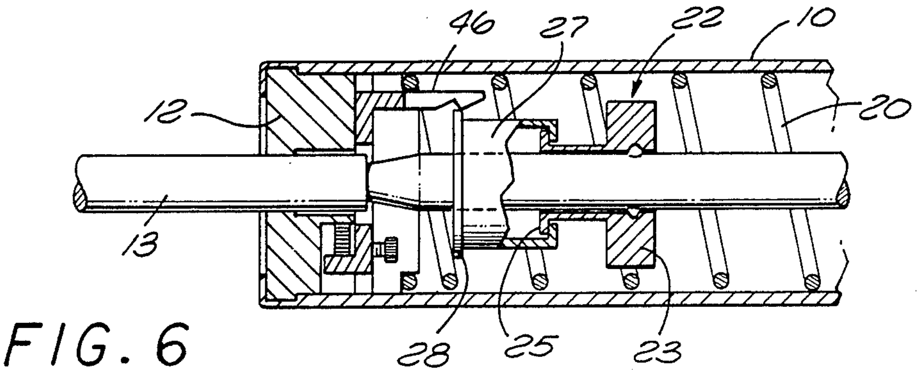

A sleeve 27 is slidingly carried on the split shell 24 of the collar 22, and has an outer rim 28. The sleeve 27 is positioned on the collar 22 by compressing the two sections of the collar split shell 24 so that the collar rim 25 will pass through the opening in the end 29 of the sleeve. The sleeve slides on the collar between the position as shown in FIG. 3 with the sleeve end 29 engaging the collar, body 23, and the position as shown in FIG. 6 with the sleeve end 29 engaging the collar rim 25. In the preferred construction, the sleeve 27 both slides and rotates on the collar 22.

The collar 22 is fixed in position on the rod 13. In the preferred embodiment, two opposed larger grooves 31 and two opposed smaller grooves 32 are provided in the collar. Two opposed ears 33 and two opposed ears 34 are carried on the rod, with the grooves 32 and ears 33 dimensioned so that the ears are a press fit in the grooves. In assembly, the collar is moved on the rod from left to right as viewed in the drawings, with the ears 34 aligned with the larger grooves 31 so that the collar can pass along the rod with the rod ears 34 passing through the larger groves 31 and with the rod ears 33 engaging the smaller collar grooves 32.

An actuator 36 is mounted in a groove 37 in the rear end plug 12, and has an elongated opening 38 for the rod 13, permitting the actuator to slide transversively in the plug 12. A screw 39 passes through a smaller enlongated opening 40 in the actuator 36 into the plug 12 for maintaining the actuator in position.

A hold open spring 41 is positioned between the bottom of a groove 42 in the plug 12 and a tab 43 of the actuator 46.

Figure 4:
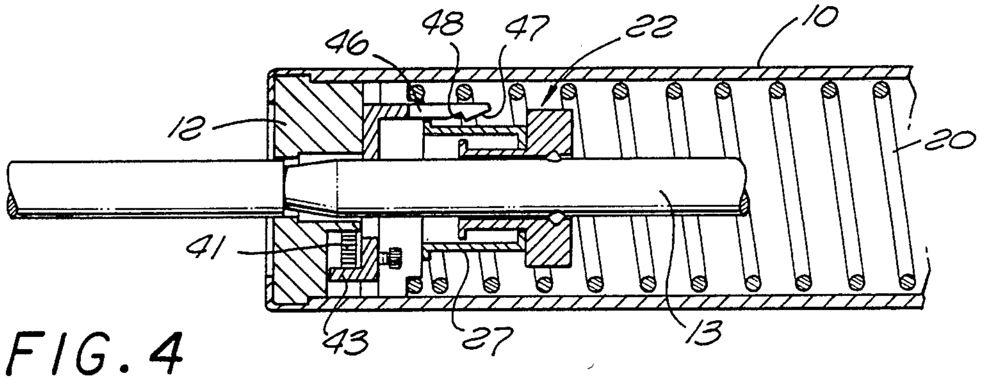

In the specific embodiment illustrated the actuator 36 includes two spaced fingers 46 which project generally axially for positioning over the sleeve 27. The inner surfaces of the fingers preferably have a sloped outer end 47 and a notch 48 with sloped faces (FIG. 4). A latching space in the form of an annual groove 49 is provided on the rod 13. The annular groove 49 preferably has a substantially square corner and a slope, as in FIGS. 3–6. Two opposed grooves 51 are provided in the passage in the rear end plug 12 for passage of the ears 34. During assembly, the outer end of the rod with the opening 17 is passed through the rear end plug 12 from right to left, with the rod ears 34 moving through the plug grooves 51.

In assembly, the main spring 20 is positioned over the rod, and the plunger 14 is attached at the inner end of the rod. The actuator 36 and spring 41 are mounted on the plug 12 and this assembly is positioned on the rod 13.

The front end plug 11 is fixed in the housing 10 and the rod and spring assembly is inserted into the housing from the opposite end. After the ears 34 of the rod are passed through the plug 12, the plug is rotated 90 degrees so that the ears 34 engage the inner of the plug 12, holding the assembly together under the pressure of the now partly compressed main spring 20. An enlarged groove 54 is provided at the end of the housing 10, and the plug 12 is sealed to the housing by bending the end of the housing at 54 over the plug. The door closer is now ready for use, with the main spring 20 compressed between the plunger 14 and the plug 12.

When the door closer is attached between a door and a door frame and the door is in the closed position, the rod 13 is moved to the right and the spring 20 is expanded. The portion of the rod to the left of the latching space 49 is positioned in the opening 38 of the actuator 36. When the door opens, the rod is moved to the left in the housing and the spring is compressed. The rod continues to move to the left bringing the latching space groove 49 into the opening 38 of the actuator. The actuator is now moved transversely by the hold open spring 41 bringing the actuator into the latching space, as shown in FIG. 3. Then when the door is released, the rod moves to the right until the wall of the groove 49 engages the actuator, thereby automatically maintaining the door in the open position.

The door is released from the hold open position by opening the door a small amount sufficient to bring the outer rim 28 of the sleeve 27 under the fingers 46 of the actuator, thereby moving the actuator transversely and compressing the hold open spring 41, as shown in FIG. 4.

The door is now released and the spring 20 expands, moving the rod and the collar 22 to the right. The sleeve 27 also moves to the right until its rim 28 lodges in the notch 48 of the actuator finger, as seen in FIG. 5.

Figure 5:
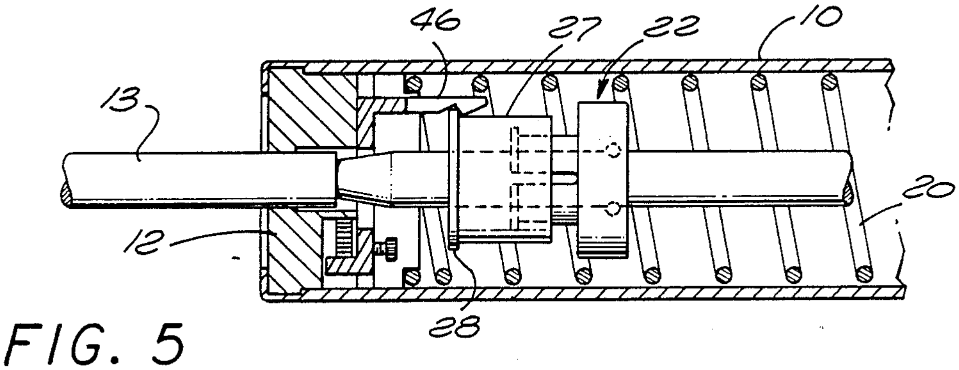

As the rod and collar continue to move to the right, the sleeve slides on the collar and remains engaged with the actuator thereby holding the actuator in the up position as seen in FIG. 5. The latching groove moves to the right past the actuator, as seen in FIG. 6. Now the door closer is no longer in the hold open position and the rod continues to move to the right under the force of the main spring to the door closed condition.

During this motion after the latching space of the rod has moved through the actuator, the outer rim 25 of the collar engages the end 29 of the sleeve and pulls the outer rim 28 of the sleeve away from the fingers 46 of the actuator. This releases the actuator and permits the hold open spring 41 to move the actuator downward, as viewed in FIG. 3. This leaves the door closer ready for another door opening and hold open operation, when the rod is again moved to the left to the position of FIG. 3.

The movement of the rod in the housing is determined by the positions of the collar 22 and the groove 49 on the rod 13. Selection of these positions during manufacture permits production of door closers with various predetermined hold open angles.

I claim:

1. In a hold open device for a door closer having a housing, a plunger rod slidingly carried in an end of said housing, a plunger at the inner end of said rod, and a mainspring positioned about said rod between said housing and said plunger, the improvement including a combination:

an actuator carried on said housing for transverse sliding motion relative to said rod, said actuator having an opening for said rod;

said rod including a collar and latch means defining a latch space on said rod;

a sleeve slidingly positioned on said collar; and hold open means positioned between said housing and said actuator for urging said actuator transversely toward said rod into latching engagement with said latch means.

2. A hold open device as defined in claim 1 wherein said sleeve and collar have first interengaging means for limiting motion of said sleeve along said collar, and wherein said actuator and sleeve have second interengaging means for moving said actuator out of said latch.

3. A hold open device as defined in claim 2 wherein said hold open means includes an actuating device between between said housing end and said actuator.

4. A hold open device as defined in claim 3 wherein said actuating device is a hold open spring.

5. A hold open device as defined in claim 2 wherein said second interengaging means includes first lip means on said sleeve, and an axial finger on said actuator for projecting over said first lip means.

6. A hold open device as defined in claim 5 wherein said first interengaging means includes first and second spaced shoulders on said collar, and second lip means on said sleeve positioned between said collar shoulders.

7. A hold open device as defined in claim 6 wherein said actuator finger has a sloped outer end and a notch with sloped faces for engaging said sleeve lip.

8. A hold open device as defined in claim 7 wherein said hold open means includes a hold open spring between said housing and said actuator.

9. A hold open device as defined in claim 1 wherein said latch space is an annular groove having a substantially square corner and a slope.

* * * * *